United States Patent [19]

Altermatt

[11] 3,884,900
[45] May 20, 1975

[54] SUBSTITUTED 4-(2-NITRO-4-PHENOXY-SULFONYLANILINO)-PHENYLAZOPYRAZOLES

[75] Inventor: Ruedi Altermatt, Buckten, Basel-Land, Switzerland

[73] Assignee: Sandoz Ltd., Basel, Switzerland

[22] Filed: May 30, 1973

[21] Appl. No.: 365,107

Related U.S. Application Data

[63] Continuation-in-part of Ser. No. 74,924, Sept. 23, 1970, Pat. No. 3,741,954.

[30] Foreign Application Priority Data

Oct. 21, 1969 Switzerland.................. 15709/69
May 16, 1973 Switzerland.................. 6967/73

[52] U.S. Cl............... 260/162; 8/26; 8/41 C; 260/163; 260/456 A; 260/505 R; 260/543 R
[51] Int. Cl..................... C09b 29/38; D06p 3/54
[58] Field of Search............... 260/162, 163

[56] References Cited

UNITED STATES PATENTS 2,879,269  3/1959  Merian................ 260/205 X
3,136,752  6/1964  Jung et al............. 260/163 X
3,344,133  9/1967  Bossard et al......... 260/163

FOREIGN PATENTS OR APPLICATIONS 770,598  10/1967  Canada................ 260/162

Primary Examiner—Floyd D. Higel
Assistant Examiner—C. F. Warren
Attorney, Agent, or Firm—Gerald D. Sharkin; Richard E. Vila; Melvyn A. Kassenoff

[57] ABSTRACT

Dyes of the formula

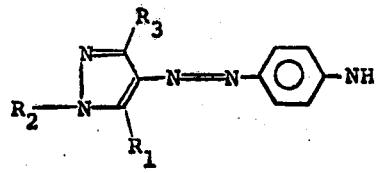

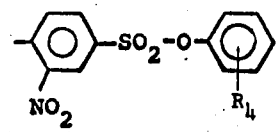

and mixtures thereof, wherein
  $R_1$ is hydroxy or amino,
  $R_2$ is hydrogen, alkyl of 1 to 4 carbon atoms, cyclohexyl, phenyl, tolyl or benzyl,
  $R_3$ is hydrogen, methyl, carbamoyl, methoxycarbonyl or ethoxycarbonyl, and
  $R_4$ is hydrogen, methyl or methoxy, are sparingly soluble in water and are highly suitable for dyeing and printing fibres, yarns and textiles consisting of synthetic or regenerated organic materials of high molecular weight and hydrophobic character.

13 Claims, No Drawings

SUBSTITUTED 4-(2-NITRO-4-PHENOXY-SULFONYLANILINO)PHENYLAZOPYRAZOLES

This application is a continuation-in-part of application Ser. No. 74,924, filed Sept. 23, 1970, now U.S. Pat. No. 3,741,954.

The new compounds have the formula

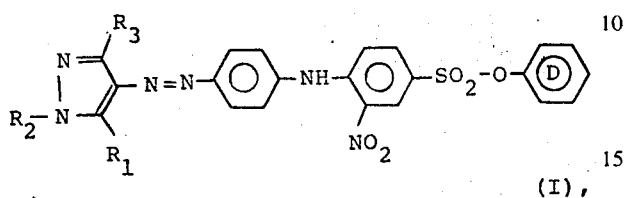

(I), wherein
$R_1$ is hydroxy or amino,
$R_2$ is hydrogen alkyl with 1, 2, 3 or 4 carbon atoms, cyclohexyl, phenyl, tolyl or benzyl,
$R_3$ is hydrogen, methyl, $CONH_2$, methoxycarbonyl or ethoxycarbonyl,
and the ring D is further unsubstituted or substituted by methyl or methoxy.

The new compounds are produced by the condensation of one mole of a compound of the formula

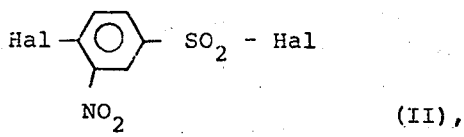

(II), where Hal represents a chlorine or bromine atom, with one mole of a phenol of the formula

(III)

and subsequently with one mole of an amine of the formula

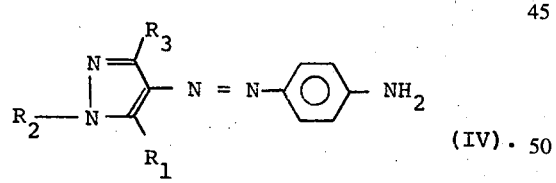

(IV).

The condensation reaction generally takes place in an inert solvent, such as water, ethanol, n-butanol, benzyl alcohol, ethylene glycol, polyethylene glycol, benzene, toluene, xylene or chlorobenzene at temperatures in the range of 25°C to 200°C. It is usually of advantage to add to the reaction mixture an agent which binds acid, such as an alkali carbonate, bicarbonate or acetate, magnesium or calcium oxide.

The halogen atom bound to the $SO_2$ group in the component of formula (II) is more highly reactive than the halogen atom bound to the nucleus; accordingly the initially added phenol of formula (III) is bound to the $SO_2$ group and the amine of formula (IV) directly to the nucleus B. It is of advantage to carry out the first step of the reaction at temperatures below 100°C and the second step at about 80°C to 200°C, if necessary in an autoclave.

The compounds of formula (I) can also be obtained by condensing one mole of a sulphonic acid of the formula

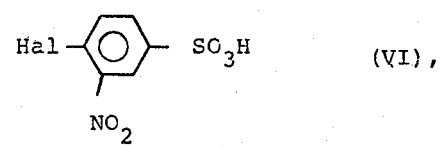

(VI), where Hal represents a chlorine or bromine atom, with one mole of an amine of formula (IV), converting the resulting compound into the sulphonic acid chloride of the formula

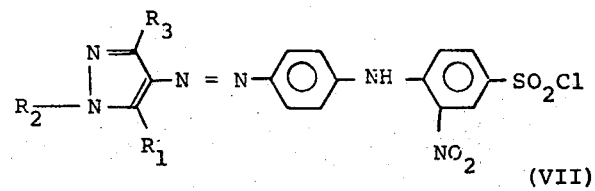

(VII)

and condensing this with one mole of a phenol of formula (III).

The condensation of the compound of formula (VI) with the amine of formula (IV), preferably in one of the aforenamed solvents, is carried out at temperatures in the range of about 80°C to 200°C, while the condensation of the compound of formula (VII) with the phenol of formula (III) is effected preferably in the same reaction medium at temperatures of 25°C to 130°C.

The compound of formula (I) can be produced by another route comprising diazotization of a compound of the formula

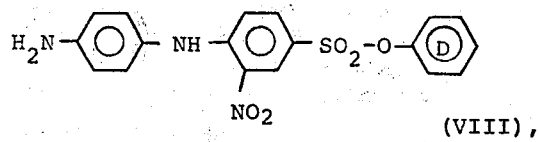

(VIII), and coupling of the resulting compound with a compound of the formula

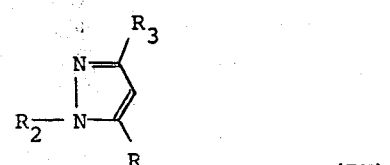

(IX).

The diazotizing and coupling reactions have been known for more than a hundred years (F. Griess, Liebig's Ann. Chem. 137, 30, 1866) and are the most frequently performed reactions in the chemistry of dyes, so there is no necessity to describe them in greater detail.

Excellent properties as dyes are shown by mixtures of compounds of formula (I). These mixtures can be produced by reacting one mole of a compound of the formula

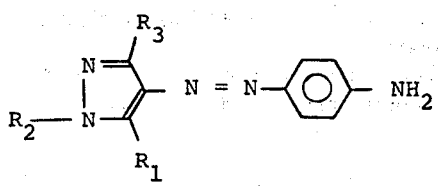

with one mole of a mixture of different compounds of the formula

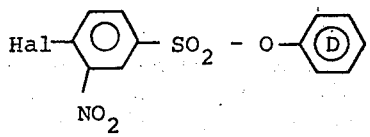

or by reacting one mole of a mixture of different compounds of the formula

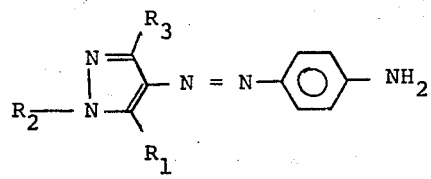

with one mole of a compound of the formula

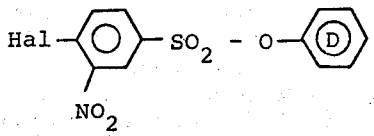

It is advantageous to convert the new dyes, produced as given in the foregoing, into dyeing preparations before application to the fibre. For this purpose standard methods are used, such as grinding in the presence of dispersing agents and/or fillers. The mixtures are dried in a vacuum or spray drier to give dry preparations. After the addition of a suitable volume of water, they can be exhaust dyed, pad dyed or printed from long or short bath as required.

From aqueous dispersion the dyes build up powerfully on fibres, yarns and textiles consisting of synthetic or regenerated organic materials of high molecular weight and hydrophobic character. They are especially suitable for dyeing and printing polyester, cellulose diacetate, cellulose triacetate and polyamide fibres and textiles of these fibres. They are also applicable to polyolefin fibres.

The known dyeing and printing methods are used, for example the process described in French Pat. No. 1,445,371.

The dyeings obtained are of yellow shade and show high fastness to thermofixation, pleating and sublimation, gas fumes, cross dyeing, dry cleaning, ozone, chlorine, and to wet treatments, such as water, washing and perspiration. They are stable to the pre-cure and post-cure permanent press finishing processes, are well dischargeable and show a good reserve of wool, rayon, silk and cotton. The light fastness is excellent, even in pale shades, which makes the dyes highly suitable as components for the production of fashionable pastel shades.

In green combination shades with blue dyes, they are free from catalytic fading. The dyes are stable at temperatures up to 200°C and are resistant to prolonged boiling, reduction and hydrolysis, especially in the range of 80°C to 140°C. This stability is not adversely affected by the liquor ratio or the hydrogen concentration in the pH region of 5 to 9, or by the presence of dyeing accelerants.

In the following Examples the parts and percentages are by weight and the temperatures in degrees centigrade.

EXAMPLE 1

39.9 Parts of the compound of the formula

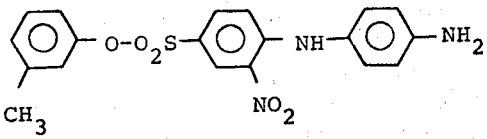

and 6 parts of sodium hydroxide are dissolved in 600 parts of water and the solution is mixed with a solution of 7 parts of sodium nitrite in 20 parts of water. The resulting solution is dropped into a mixture of 50 parts of water, 100 parts of ice and 35 parts of 35 % hydrochloric acid. Stirring is continued for 3 hours at 0°–5°, then the excess sodium nitrite is decomposed with 0.5 part of aminosulphonic acid. The diazonium salt solution thus formed is dropped slowly at 0°–5° into a solution of 17.4 parts of 1-phenyl-3-methyl-5-pyrazolone, 6 parts of sodium hydroxide and 8 parts of sodium carbonate in 100 parts of water and 50 parts of ice. The coupling mixture is stirred for 3–4 hours at 0°–5°, after which time the newly formed dye is filtered, washed with water and dried. The pure dye of the formula

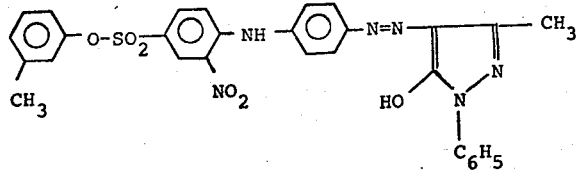

gives yellow dyeings on synthetic fibres which have excellent fastness properties.

EXAMPLE 2

41.5 parts of a compound of the formula

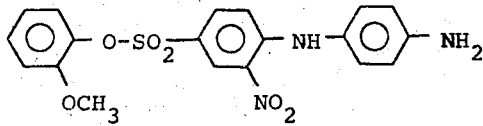

and 6 parts of sodium hydroxide are dissolved in 600 parts of water. A solution containing 7 parts of sodium nitrite in 20 parts of water is added to the first solution. The resulting solution is fed slowly, over a period of 30 to 45 minutes, into a well-stirred mixture containing 50 parts of water, 100 parts of ice and 35 parts of 35 % hydrochloric acid. After this, the mixture is stirred for a further 3 to 4 hours at a temperature of 0° to 5°, at the end of which time the excess sodium nitrite is decomposed by the addition of 0.5 part of aminosulphonic acid.

The diazonium salt solution so obtained is fed slowly, at a temperature of 0° to 5°, into a mixture containing 9.8 parts of 3-methyl-5-pyrazolone, 6 parts of sodium hydroxide and 8 parts of sodium carbonate in 100 parts of water plus 100 parts of ice.

The reaction mixture is stirred for a further 3 to 4 hours at a temperature of 0° to 5°, whereupon the dyestuff is almost completely precipitated. The precipitate is filtered off, washed with water and dried. The pure dyestuff has the following formula

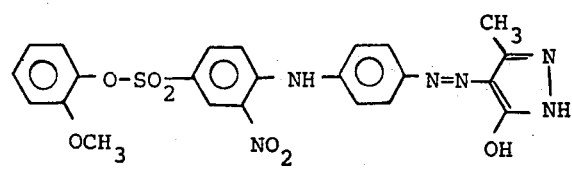

and dyes synthetic fibres in yellow tones with outstanding fastness properties.

EXAMPLE 3

38.5 parts of a compound of the formula

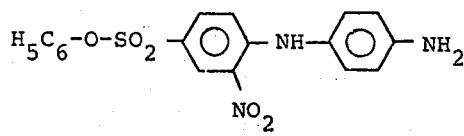

and 6 parts of sodium hydroxide are dissolved in 600 parts of water. A solution containing 7 parts of sodium nitrite in 20 parts of water is added to the first solution. The resulting solution is fed over a period of 30 to 45 minutes into a well-stirred mixture containing 50 parts of water, 200 parts of ice and 35 parts of 35 % hydrochloric acid.

After this, the mixture is stirred for a further 3 to 4 hours at a temperature of 0° to 5°, at the end of which time the excess sodium nitrite is decomposed by the addition of 0.5 part of aminosulphonic acid.

The diazonium salt solution so obtained is fed slowly into a mixture containing 17.4 parts of 1-phenyl-3-methyl-5-aminopyrazol, 200 parts of glacial acetic acid and 100 parts of ice. The reaction mixture is buffered with sodium acetate to a pH value of 2.5 to 3.5, and further stirred for 1 to 2 hours at a temperature of 0° to 5° until the reaction is completed. The precipitated dyestuff is then filtered off, after which the residual acid is washed out with water and the product is dried. It has the formula

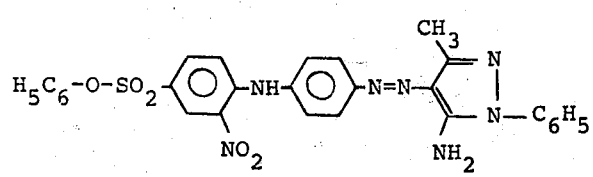

The pure dyestuff dyes synthetic fibres in yellow tones with outstanding fastness properties.

EXAMPLE 4

A mixture containing 31.4 parts of the phenyl ester of 1-chloro-2-nitrobenzene-4-sulphonic acid, 32.8 parts of the (3'-methyl)-phenyl ester of 1-chloro-2-nitrobenzene-4-sulphonic acid, and 58.4 parts of the compound of the formula

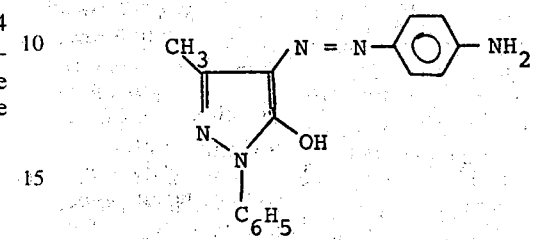

300 parts of ethyl alcohol, 100 parts of water and 10 parts of magnesium oxide, is heated with stirring in an autoclave at a temperature of 160° to 165° for 24 hours. The reaction mixture is then allowed to cool to 30° with vigorous stirring, after which the crystallised dyestuff mixture is filtered off, washed first with 200 parts of cold ethyl alcohol and then with hot water, and finally dried. The dyestuff mixture so obtained dyes synthetic fibres in yellow tones with outstanding fastness properties and comprises the following components:

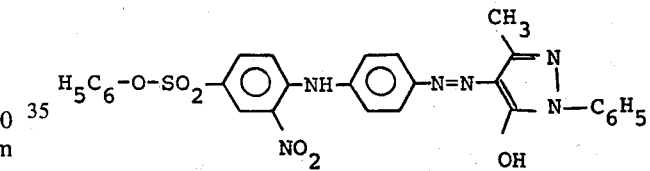

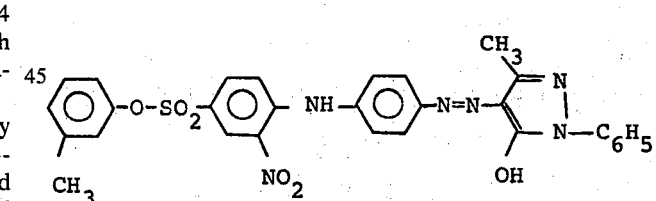

EXAMPLE 5

38.5 parts of the compound of the formula

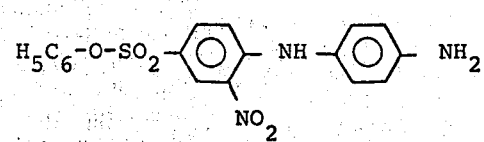

and 39.9 parts of the compound of the formula

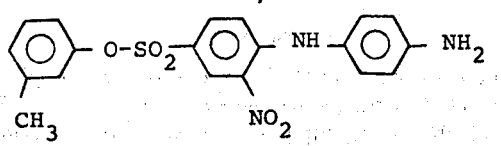

plus 12 parts of sodium hydroxide are dissolved in 1200 parts of water. To this first solution a second solution of 14 parts sodium nitrite in 40 parts of water is added. The resulting solution is added dropwise with thorough stirring over a period of 30 to 45 minutes to a mixture of 100 parts of water, 400 parts ice and 70 parts of 35 % hydrochloric acid. After this, the mixture is stirred for a further 3 to 4 hours at a temperature of 0° to 5°, at the end of which time the excess sodium nitrite is decomposed by the addition of 1 part of aminosulphonic acid. The diazonium salt solution so obtained is fed slowly, over a period of 30 minutes into a solution containing 25 parts of 1-isopropyl-5-aminopyrazol, 400 parts of glacial acetic acid and 300 parts of ice. The reaction mixture is buffered with sodium acetate to a pH value of 2.5 to 3.5, and further stirred for 1 to 2 hours at a temperature of 0° to 5° until the reaction is completed. The precipitated dyestuff mixture thus obtained comprises the following two components:

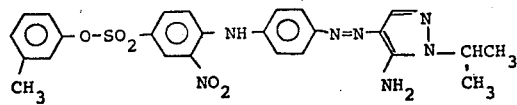

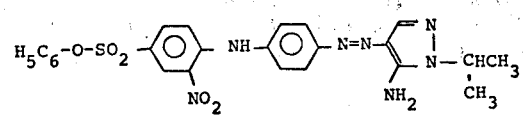

slowly fed over a period of 30 to 45 minutes into a solution containing 16.5 parts of 1-cyclohexyl-5-aminopyrazol, 17.3 parts of 1-benzyl-5-aminopyrazol and 13.9 parts of 1-isopropyl-3-methyl-5-aminopyrazol in 600 parts of glacial acetic acid and 450 parts of ice. The reaction mixture is buffered with sodium acetate to a pH value of 3.0 to 4.0, and further stirred for 1 to 2 hours at a temperature of 0° to 5° until the reaction is completed. The dyestuff is then filtered off, washed with water and dried. The dyestuff so obtained is a mixture containing the following three components:

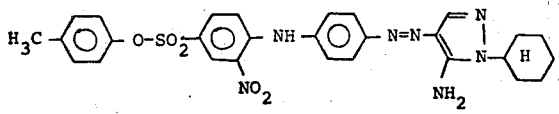

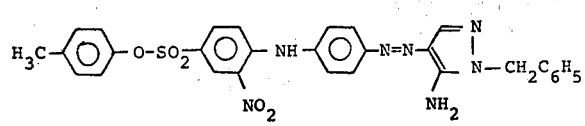

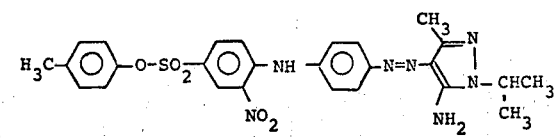

The dyestuff mixture is filtered off, washed with water and then dried. It dyes synthetic fibres in yellow tones with outstanding fastness properties.

EXAMPLE 6

119.7 parts of a compound of the formula

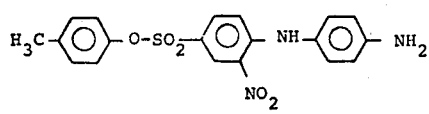

and 18 parts of sodium hydroxide are dissolved in 1,800 parts of water. A solution containing 21 parts of sodium nitrite in 60 parts of water is added to this first solution. The resulting solution is fed over a period of 30 to 45 minutes into a well-stirred mixture containing 150 parts of water, 600 parts of ice and 105 parts of 35 % hydrochloric acid. After this, the mixture is stirred for a further 3 to 4 hours at a temperature of 0° to 5°, at the end of which time the excess sodium nitrite is decomposed by the addition of 1.5 parts of aminosulphonic acid. The diazonium salt solution so obtained is and dyes synthetic fibres in yellow tones with outstanding fastness properties.

EXAMPLE 7

A mixture containing 38.5 parts of a compound of the formula

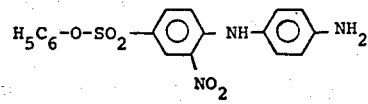

and 39.9 parts of a compound of the formula

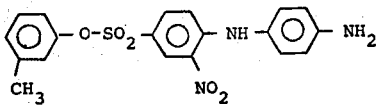

is diazotized in an analogous manner to that used for Example 5. The diazonium salt solution so obtained is fed over a period of 1 hour at a temperature of 0° to 5°.

into a solution containing 18.8 parts of 1-(3'-methyl)-phenyl-3-methyl-5-pyrazolone, 9.8 parts of 3-methyl-5-pyrazolone, 12 parts of sodium hydroxide and 16 parts of sodium carbonate in 200 parts of water and 200 parts of ice. The reaction mixture is further stirred for 3 to 4 hours at a temperature of 0° to 5°, whereupon the dyestuff is almost completely precipitated. The said dyestuff is then filtered off, washed with water and dried. The dyestuff so obtained is a mixture of the following four components, and dyes synthetic fibres in yellow tones with outstanding fastness properties:

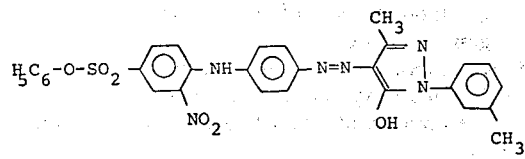

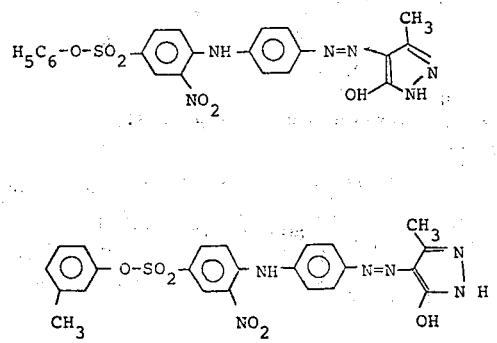

and

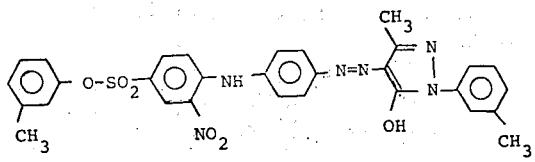

Application Example 1

A mixture of 7 parts of the dye produced as in Example 3, 4 parts of sodium dinaphthylmethanedisulphonate, 4 parts of sodium cetylsulphate and 5 parts of sodium sulphate is ground in a ball mill for 48 hours to give a fine powder. Two parts of the powder are dispersed in a bath of 3,000 parts of water set with 3 parts of a 30 % solution of a highly sulphonated castor oil and 20 parts of an emulsion of a chlorinated benzene. 100 parts of a fabric of polyester fibre are entered into this dyebath at 20°–25°. The temperature is increased to 95°–100° in about 30 minutes and the fabric dyed for 1 hour at this temperature. It is then removed, rinsed, soaped for 15 minutes at 70° with a 0.1 % solution of an alkylphenylpolyglycolether, rinsed again and dried. A reddish yellow dyeing, having excellent fastness properties, is obtained.

Application Example 2

A mixture of 30 parts of the dye produced as in Example 2, 40 parts of sodium dinaphthylmethanedisulphonate, 50 parts of sodium cetylsulphate and 50 parts of anhydrous sodium sulphate is ground in a ball mill for 48 hours to give a fine powder. 4 Parts of the powder are dispersed in 1,000 parts of water at 40°–50°.

100 Parts of a scoured fabric of polyester fibre are entered into the bath and, after slow heating to 130°, the fabric is dyed for about 1 hour at this temperature under pressure. On removal it is rinsed, soaped, rinsed and dried. A reddish yellow dyeing with excellent fastness properties is obtained.

Application Example 3

A fine aqueous dispersion of 30 parts of the heterogenous dye produced as in Example 4, 70 parts of sodium dinaphthylmethanedisulphonate and 3 parts of sodium alginate is made up to 1000 parts with water and stirred well. A polyester fabric is padded with this liquor at 20°, air dried at 60°–100° and treated for 1 minute in dry heat at 230° for fixation of the dyeing. The fabric is then rinsed, soaped, rinsed again and dried. A level reddish yellow dyeing with good fastness properties is obtained.

The dyes listed in the following table correspond to the formula

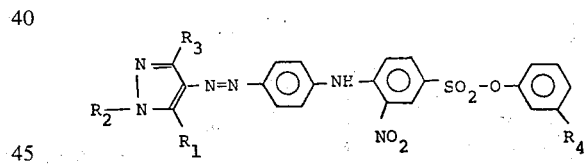

TABLE

| Exmpl. No. | R₁ | R₂ | R₃ | R₄ | Shade on Polyester fibre |
|---|---|---|---|---|---|
| 8 | —OH | —C₆H₅ | —CH₃ | —OCH₃ | reddish yellow |
| 9 | do. | H | do. | do. | do. |
| 10 | do. | —C₆H₅ | —CONH₂ | —CH₃ | yellow |
| 11 | —NH₂ | do. | H | do. | do. |
| 12 | do. | —CH₂C₆H₅ | H | do. | do. |
| 13 | do. | —C₆H₅ | —COOCH₃ | do. | do. |
| 14 | do. | do. | —COOC₂H₅ | do. | do. |

Representative dyestuffs of the foregoing Examples have the formulae

Example 3, the mixture dyestuffs of the formulae and

Example 4, and the mixture of dyestuffs of the formulae and

Example 5.

What we claim is:
1. A compound of the formula wherein
  $R_1$ is hydroxy or amino,
  $R_2$ is hydrogen, alkyl of 1 to 4 carbon atoms, cyclohexyl, phenyl, tolyl or benzyl,
  $R_3$ is hydrogen, methyl, carbamoyl, methoxycarbonyl or ethoxycarbonyl, and
  $R_4$ is hydrogen, methyl or methoxy.

2. A compound according to claim 1 wherein
  $R_2$ is hydrogen, alkyl of 1 to 4 carbon atoms, phenyl or benzyl, and
  $R_3$ is hydrogen, methyl or carbamoyl.

3. A compound according to claim 2 wherein $R_4$ is methyl or methoxy.

4. A compound according to claim 1 wherein $R_2$ is cyclohexyl.

5. A compound according to claim 1 wherein $R_2$ is tolyl.

6. A compound according to claim 1 wherein $R_3$ is methoxycarbonyl or ethoxycarbonyl.

7. A compound according to claim 1 wherein $R_4$ is hydrogen.

8. A compound according to claim 1 wherein $R_4$ is methyl or methoxy and is in the 3-position.

9. The compound according to claim 1 having the formula

10. The compound according to claim 1 having the formula

11. The compound according to claim 1 having the formula

12. The compound according to claim 1 having the formula

13. The compound according to claim 1 having the formula

* * * * *